United States Patent [19]

Cain et al.

[11] 3,708,828
[45] Jan. 9, 1973

[54] BONE HOLDING MECHANISM

[75] Inventors: Wayne R. Cain, Grand Rapids; Konrad H. Marcus, Konrad H.; Edgar D. Prince, both of Holland, all of Mich.

[73] Assignee: Prince Corporation, Holland, Mich.

[22] Filed: March 11, 1971

[21] Appl. No.: 123,246

[52] U.S. Cl..........................................17/1 G, 17/46
[51] Int. Cl................................................A22c 17/04
[58] Field of Search..................................17/1 G, 46

[56] References Cited

UNITED STATES PATENTS

| | | | |
|---|---|---|---|
| 3,216,056 | 11/1965 | Segur | 17/1 G |
| 3,233,282 | 2/1966 | Segur | 17/1 G X |

*Primary Examiner*—Lucie H. Laudenslager
*Attorney*—Price, Heneveld, Huizenga & Cooper

[57] ABSTRACT

This disclosure relates to a bone holding mechanism for supporting a bone by one end thereof while meat stripping operations are performed. In one of its embodiments, the invention relates to an apparatus which holds the tibia bone with the meat thereon while removing the fibula bone prior to the meat stripping operation. In another embodiment of the invention, the mechanism holds the tibia bone while the entire meat is being stripped. In each embodiment, the bone holding mechanism comprises a pair of cam-controlled, resiliently biased, movable jaws. In response to insertion of a bone, a triggering mechanism allows the jaws to move toward each other to hold the bone from rotational and longitudinal movement. In a more specific aspect of the latter embodiment, a sliding gate, in response to the triggering mechanism, is moved into a position adjacent to the ends of and surrounding the jaws to hold the bone from movement while deboning operations are performed. At the completion of the deboning operation, the jaws are released, and the bone is released from the holder.

23 Claims, 14 Drawing Figures

PATENTED JAN 9 1973

3,708,828

INVENTORS
EDGAR D. PRINCE
KONRAD H. MARCUS
WAYNE R. CAIN

BY

ATTORNEYS

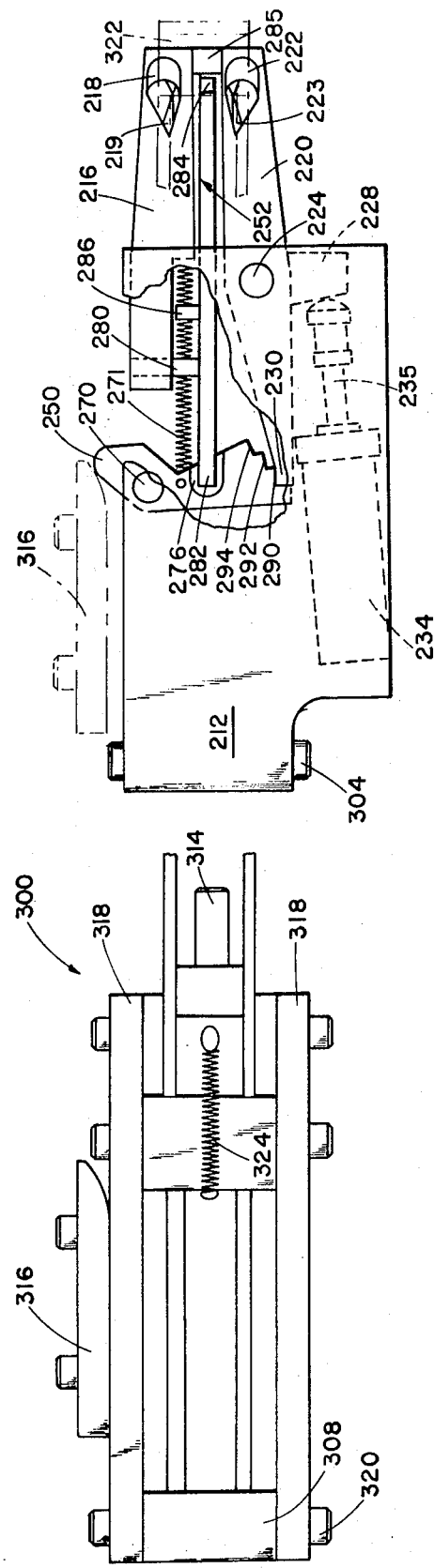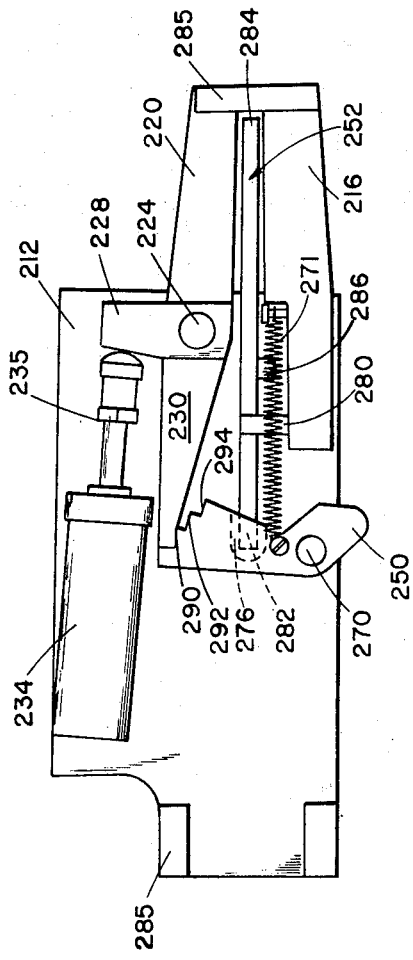

BONE HOLDING MECHANISM

BACKGROUND OF THE INVENTION

In United States Pat. Nos. 3,457,586; 3,486,187, and 3,522,738, various methods and apparatus are disclosed to remove bones from animal meats cuts, such as hams. U.S. Pat. No. 3,457,586 specifically discloses a deboning apparatus wherein the meat cut to be deboned is held by an end of the bone so that the bone is retained from longitudinal and rotational movement while a rotating, dull-edged plow member is urged against and along the length of the bone such that the plow member moves away from the held end of the bone.

A divisional application of U.S. Pat. No. 3,457,586 filed Apr. 28, 1969, Ser. No. 819,813 now U.S. Pat. No. 3,609,797 issued Oct. 15, 1971, entitled BONE HOLDING MECHANISM, discloses bone holding chuck mechanisms which may be utilized in the above-described deboning apparatus. The bone holding structures disclosed therein are adapted to hold the expanded end portion of the tibia bone in a wedge-shaped opening. The bone is restricted from longitudinal and rotational movement while the meat is being removed. Of the several embodiments of bone holding devices shown, each requires that the bone be inserted and manually positioned within the chuck to the most desirable holding position. It is also necessary to have an assortment of various sized bone chucks to accommodate varying sizes of bones.

Massengill U.S. Pat. No. 2,893,051 discloses a process of stripping meat from a bone wherein the bone is pulled longitudinally while holding the meat against a restricted variable opening which scrapes the meat from the bone. The bone is held by clamping jaws which squeeze the bone tighter as more force is used to pull the bone in a longitudinal direction. The clamping jaws often cause crushing of the bone.

SUMMARY OF THE INVENTION

While each of the above holding devices are reasonably easy to load and unload and are vast improvements over the earlier prior art holding devices which tended to crush the bone, it now remains even more desirable to provide a holding mechanism which will automatically adjust itself to various sized bones, will grip the bone without damage, and will release the bone upon completion of the operations being performed thereon.

According to this invention, there is provided a mechanism for holding an exposed portion of a bone from longitudinal, lateral, and rotational movement while deboning operations are being performed. The holding structure, in its first position, has a movable clamp or jaw which will accommodate bones of varying sizes. Upon insertion of a bone between the jaws, they are automatically moved toward a closed position, as a control or trigger mechanism trips a jaw restraining or locking means to prevent the jaws from opening. Biasing means move the jaws toward a closed position, holding the bone and preventing its rotation. At the completion of the deboning operation, a cam mechanism releases the bias on the jaws and on the jaw restraining and locking means allowing the bone to be removed.

In one embodiment of the invention, a sliding gate, in response to movement of the trigger mechanism, moves over the jaws and provides an additional gripping action on the bone. At the completion of the deboning operation, the gate returns to its first position and through cam actuating surfaces mounted therein, the control trigger mechanism on the jaw restraining means is reset, and the meat is released from the jaws.

OBJECTS OF THE INVENTION

By various aspects of this invention, one or more of the following, or other, objects can be obtained.

It is an object of this invention to provide an improved bone holding mechanism to support the end of a bone while the meat is being stripped therefrom.

It is another object of this invention to provide a bone holding and gripping mechanism wherein the bone is firmly restrained from longitudinal and rotational movement during automated deboning operations.

It is yet another object of this invention to provide a bone holding mechanism wherein the mechanism is automatically biased toward a gripping position as a bone is inserted.

Another object of this invention provides a bone holding mechanism which automatically releases the bone upon completion of the deboning operation.

Another object of this invention provides a resetting mechanism to release the bias on the movable jaw for insertion of another bone.

It is yet another object of this invention to provide a bone holding mechanism for supporting bones in a meat stripping operation wherein the bones are quickly and easily loaded into the mechanism and removed therefrom following the meat stripping operation.

Other aspects, objects, and the several advantages of this invention will become apparent to one skilled in the art from a study of this disclosure, the drawings, and the appended claims.

BRIEF DESCRIPTION OF THE DRAWINGS

The invention will now be described with reference to the accompanying drawings in which:

FIG. 12 is a top plan view of a second embodiment of the invention with portions of the structure broken away for clarity;

FIG. 14 is a bottom view of the bone holding apparatus shown in FIGS. 12 and 13.

THE FIRST EMBODIMENT

Figure 1:
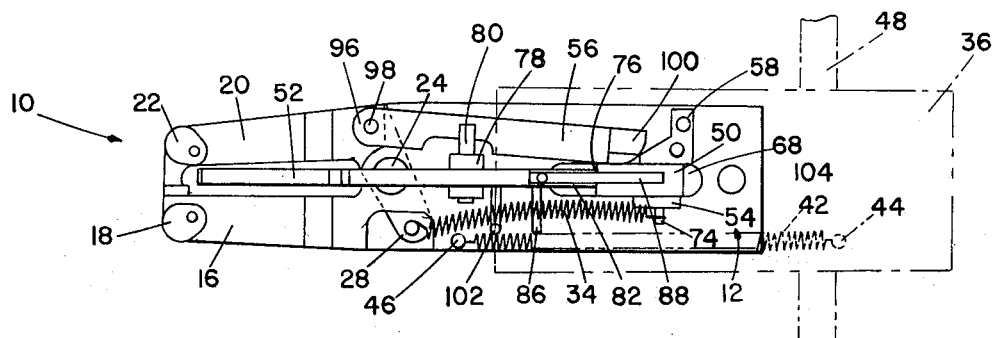
FIG. 1 is a top plan view showing a first embodiment of the bone holding mechanism of this invention with the gate mechanism shown in phantom for clarity.

In accordance with the first embodiment of this invention, the apparatus is utilized for holding the tibia bone of a meat cut in a portion wherein the ham is freely suspended from the end of the tibia bone. FIGS. 1 through 11 disclose the first embodiment in which the bone holding device is generally indicated by the reference numeral 10. The mechanism is adapted for mounting on the bone supporting arm of a deboning machine (not shown) of the type disclosed in the above-mentioned U.S. Pat. No. 3,457,586.

The bone holding device 10 includes a base member 12, having a fixed jaw or clamping surface 16 formed as an integral part of the base. The fixed jaw 16 is welded to the base member and extends along one side of the base and is provided with an outwardly extending clamping member 18. A movable jaw 20 also having an outwardly extending clamping member 22, is pivotally mounted on the base member 12 on a pin 24. (See FIG. 11.) As best viewed in FIGS. 3 and 11, the movable jaw 20, pivoted about the pivot pin 24 has a transversely extending arm portion 28 which is of reduced thickness as compared to laterally extending portion 30. An upstanding pin 32 (FIGS. 2 and 11), fixed in the arm portion 28, is connected to one end of the bias spring 34 which urges the movable jaw 20 about the pivot pin 24 toward a closed position with respect to the fixed jaw 16.

Figure 11:
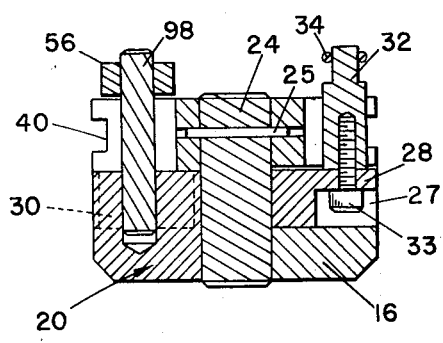
FIG. 11 is a cross-sectional view taken along lines 11—11 of FIG. 5 illustrating the pivotal connection of the movable jaws.

The pivotal connection of the movable jaw 20 about the pivot pin 24 on the base member 12 is illustrated in greater detail in FIG. 11. As illustrated, the pivot pin 24, fixed in the base member 12, is held from rotational movement by a transversely extending pin 25 which is placed through a hole in the base and the pivot pin 24. An opening 27 is provided between the top surface of the base and the fixed jaw or clamping surface 16 to receive the movable jaw 20 and its extended arm 28 about the pivot pin. The upstanding pin 32 is fixed to the arm portion by means of a screw 33 passing through the arm 28 and threadably received in the pin 32. A second pivot pin 98 fixed in the movable jaw 20 extends upwardly above the top of the base member 12 where it is pivotally connected to a jaw opening link 56 which will be more fully described hereinafter.

Figure 8:
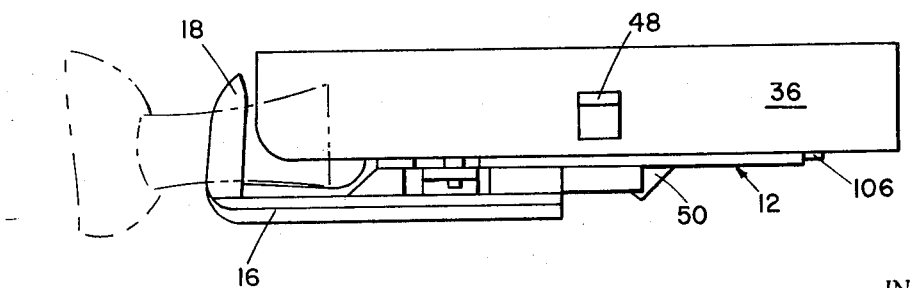
FIG. 8 is a side elevational view showing the sliding gate mechanism in the bone holding position.
Figure 9:
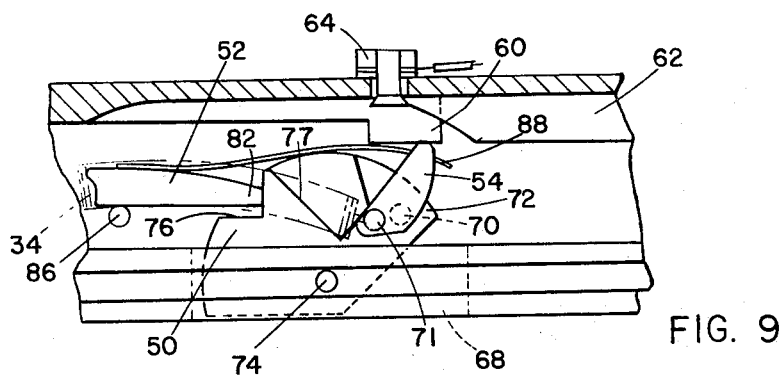
FIG. 9 is an enlarged view of the jaw restraining means in a bone receiving position.
Figure 10:
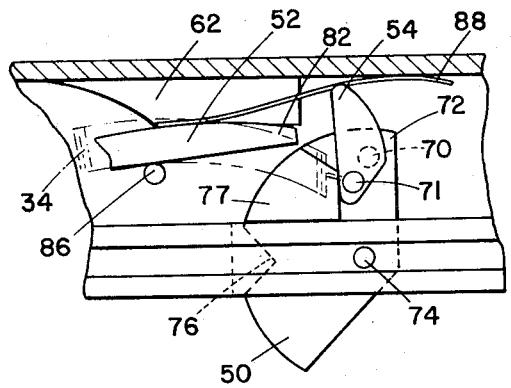
FIG. 10 is a view similar to FIG. 9 showing the jaw restraining means in a released or bone holding position.

A gate mechanism 36, semi-circular in shape, is slidably received on the base 12. The curved sides of the gate member 36 are turned inwardly at their lower end to form runners 38 (FIG. 4) which are slidably received in machined track portions 40 on the base member. A second bias spring 42 (FIGS. 1 and 3) is attached at one of its ends to the gate on a pin 44 (FIG. 3) and at its other end to the base member 12 on a pin 46 (FIG. 1). When a bone is placed between the jaws 16 and 20, the gate 36 is urged toward the upstanding clamping members 18 and 22 on the jaw by the spring. A bone held between the jaws, therefore, is prevented from sliding out from between the clamping members 18 and 22 by the gate 36 (FIG. 8).

The invention as thus far disclosed in its most rudimentary form has proven useful for bone holding operations in a bone stripping machine. It has been found desirable, however, when operating on a production basis, to provide additional means to automatically close the jaws; to prevent the jaws from opening during operations; to start the machine; and to open the jaws when the stripping operation is completed. The additional structure necessary to perform these additional functions will now be described in greater detail.

Positioned on the base member 12 are a movable jaw stop or restraining mechanism 50; a control or trigger assembly 52; a catch release cam 54; a jaw opening link 56; and a jaw opening cam 58. The sliding gate 36 carries on its inner surface a jaw opening actuator 60; a catch release actuator 62; and a switch contact 64. A pair of outwardly extending ears 48 are mounted on the outer surface of the gate and are used to control the movement of the gate with respect to the base member during deboning operations.

The movable jaw restraining means 50 (FIGS. 9 and 10) is rotatably mounted on a pin 74 in an elongated slot 68 provided in the central portion of the base member. The catch release cam 54 is pivotally mounted on a pivot pin 70 on the jaw stop 50 in a recessed portion 72 of the jaw restraint. An outwardly extending pin 71 on the lower portion of the release cam 54 is connected to the other end of the previously described bias spring 34 which is connected to the movable jaw.

Figure 2:
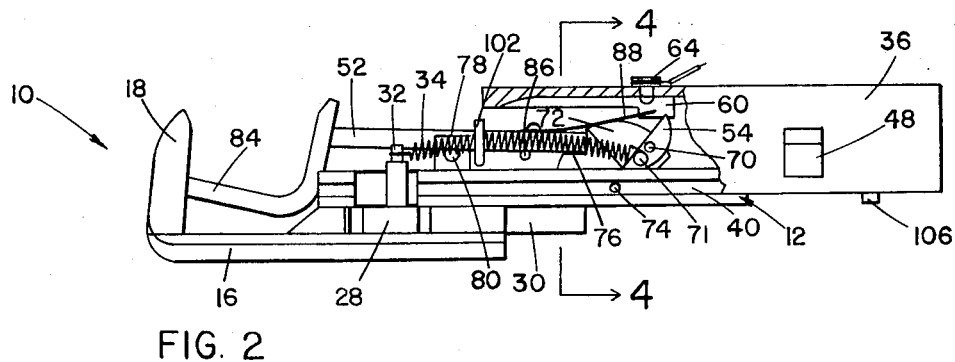
FIG. 2 is a side view of the mechanism shown in FIG. 1 with portions of the sliding gate mechanism broken away for clarity.
Figure 3:
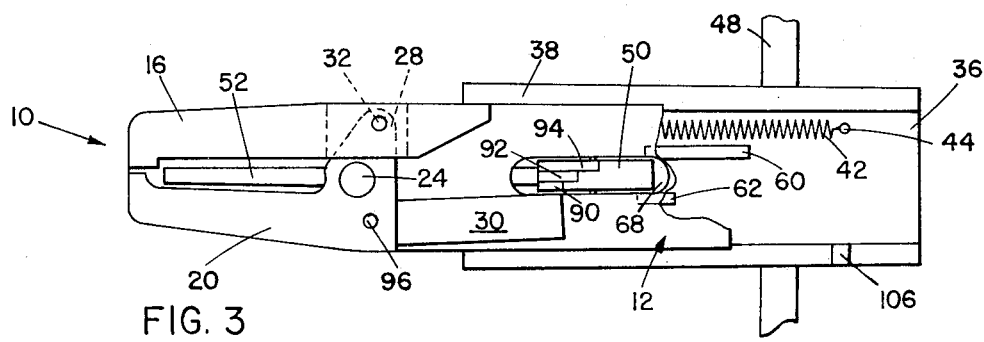
FIG. 3 is a bottom view of the bone holding mechanism showing the movable jaw and the restraining means with prevents the jaw from opening beyond a given point.

The bias spring 34 urges the catch release cam 54 into an upright position as viewed in FIGS. 2 and 11 while at the same urging the jaw restraint 50 to rotate in a counter-clockwise direction. Rotation of the jaw restraint 50 is prevented by means of the control trigger assembly 52 which in a first position (FIG. 9) bears against a step 76 cut into the surface of the jaw restraint.

The control trigger assembly 52 extends along the length of the base member and terminates in an "L" shaped end 84 between the jaws 14 and 16. The central portion of the control trigger is hingedly mounted and supported slightly above the base 12 by means of a hinge pin 80 supported on support members 78. When in a first position, the trigger 52 prevents the rotation of the jaw stop 50 by having one of its ends 82 positioned in the stepped portion 76 of the jaw restraint. When a bone is inserted between the jaws of the holder (FIG. 6), it contacts the "L" shaped portion pushing it toward the jaw surfaces causing the trigger to rock on the hinge pin 80. At the same time, the opposite end 82 of the trigger assembly rises out of the stepped portion 76 of the jaw restraint, allowing the bias spring 34 to rotate the jaw restraint in a counter-clockwise direction to assume the position shown in FIG. 10.

The control trigger assembly 52 is normally biased against the jaw restraint 50 by means of a transversely extending pin 86 fixed to the trigger and extending under the bias spring 34. A resilient contact member 88 fixed to the upper surface of the trigger assembly above the jaw restraint 50 is provided to make contact between the bone holding assembly and an isolated switch contact 64 carried by the gate 36, when the trigger is moved with the insertion of a bone between the jaws.

The rotatable, movable jaw restraint 50 has a series of steps 90, 92 and 94 (FIGS. 3 and 7) machined into its lower surface. The steps are provided to engage the movable jaw extension 30 preventing its further opening once the control trigger assembly has been released, allowing the jaw restraint 50 to rotate. As the movable jaw 20 is moved toward a closed position, the extension 30 moves along the steps 90, 92 and 94, progressively allowing each one to drop into a new position against the extension 30, thereby preventing its further opening.

Figure 7:
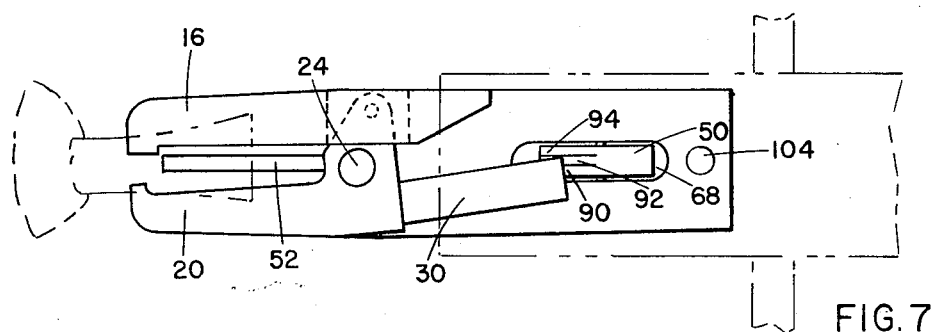
FIG. 7 is a bottom view of FIG. 6 showing the jaw restraining structure in a position to prevent the jaw from opening.

FIG. 7 illustrates a bone held between the jaws with the jaw restraint 50 released. The extended arm 30 of the movable jaw 20 bears against the step 94 of the jaw restraint thereby preventing the jaw restraint from opening beyond that point as the bone is pulled between the clamping members 18 and 22 during deboning operations. If the bone should be rotated toward a position having a narrower cross-section during the deboning operation, the movable jaw 20 is further closed by bias spring 34. As the extending arm 30 moves across the jaw restraint, steps 92 or 90 prevent it from further opening.

The jaw opening link 56 (FIGS. 1 and 5) is connected at one of its ends 96 on a pivot pin 98 to the movable jaw 20 and extends along the length of the base member 12. At its other end the link 56 is provided with an upstanding, rounded end surface 100. A jaw opening cam 58 is fixed to the base member 12 and cooperates with the rounded surface 100 of the link 56. The link is biased into engagement with the cam 58 by means of a transversely extending arm 102, fixed at one end to the link and bent upwardly at its other end around the bias spring 34. As the jaw 20 is opened, the link 50 moves along the length of the base member 12 into the jaw release cam 58 and slightly outwardly toward the side of the base, while it is being held against the cam surface by the bias spring 34 acting through the extending arm 102.

Bias spring 34 is therefore seen to provide five individual biasing functions. That is, bias spring 34 provides proper bias for the movable jaw 20; control trigger assembly 52; movable jaw link 56; catch release 54 and movable jaw restraint 50.

OPERATION OF FIRST EMBODIMENT

A mounting hole 104 is provided in the base member 12 for mounting the bone holder on a bone supporting arm within the deboning apparatus as shown in the previously described U.S. Pat. Nos. 3,457,586; 3,486,187 and 3,522,738.

Figure 5:
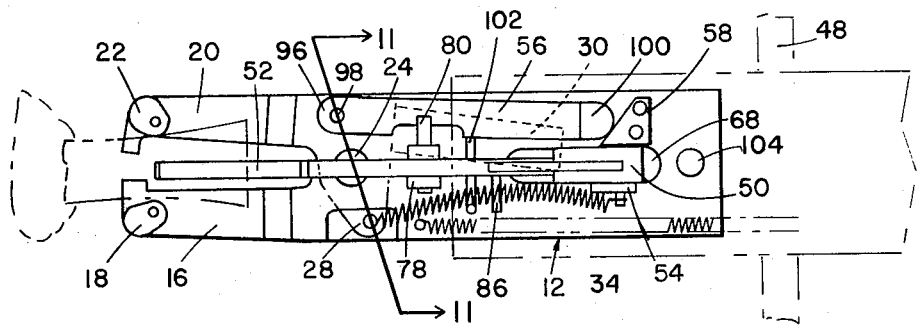
FIG. 5 is a view like FIG. 1 showing a bone inserted between the jaws.

The article contour following mechanism disclosed in U.S. Pat. No. 3,522,738 is positioned around the bone holder 10 and in a first position contacts the extending ears 48 of the sliding gate, holding it in an upward or open position. With the gate 36 open, the jaw 20 is movable with respect to the fixed jaw 16 against the bias provided by spring 34. Referring to FIG. 5, as a bone is placed between the clamping members 18 and 22, on jaws 16 and 20, movable jaw 20 opens slightly to allow the bone to be positioned therebetween. As the bone is pressed further into the jaws, it contacts the L-shaped portion 84 of the control trigger mechanism 52 (FIG. 6), pushing it toward the arm of the jaws 16 and 20. The end 82 of the control trigger mechanism 52 (FIGS. 9 and 10) lifts out of the step 76 in the jaw restraint 50 allowing it to rotate in a counter-clockwise direction in response to the bias provided by spring 34. As the jaw restraint 50 rotates, one of the stepped portions 90, 92 or 94 (FIG. 7) on the lower surface of the jaw restraint 50 contacts the extended arm 30 of the movable jaw 20 preventing its further opening movement.

As the control trigger is moved out of the step 76 in the jaw restraint 50, the switch contact member 88 momentarily contacts the switch contact 64 carried on the gate 30 to energize a relay (not shown) starting the deboning machine. As the deboning apparatus commences its deboning operation, moving toward the jaws, the sliding gate is urged by spring 42 toward the clamping members 18 and 22 on the jaws. The catch release actuating cam 62, carried on the inner surface of the gate 36, pushes catch release cam 54 forwardly (to the left as viewed in FIGS. 3 and 9) out of its way against bias spring 34. Similarly, jaw opening link 56 is moved out of the path of actuator 60 (FIG. 4) as it is urged toward the side of the base 12. When the gate 36 has reached the limit of its travel (FIG. 8), as defined by a gate stop member 106 fixed on the gate runner surface which contacts the base member 12, the bone is securely held between the jaws and cannot be pulled outward because of the position of the sliding gate 36.

When the contour follower mechanism of U.S. Pat. No. 3,522,738 or any similar deboner has completed plowing the meat from the bone, the mechanism is moved upwardly (to the right as viewed in FIGS. 1 through 10) to the first position. As the mechanism contacts the ears 48 on the sliding gate 36, the gate moves toward the first position and automatically releases the jaw restraining means 50, the movable jaw 20 and resets the control trigger mechanism 52.

Figure 4:
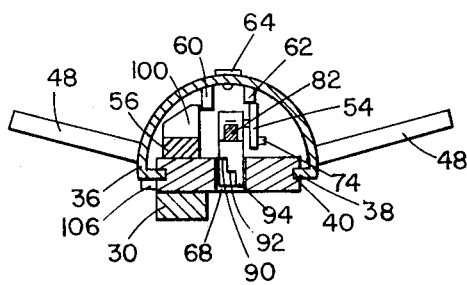
FIG. 4 is a cross-sectional view taken along lines 4—4 of FIG. 2.

The actuator 60 carried on the inner surface of gate 36 forcibly contacts the upstanding portion 100 of the link 56 pulling it against the cam surface 58 (FIG. 4). By virtue of the pivoted connection of the link 56 to the movable jaw at pivot pin 98, the jaw is opened and the bone falls away. As the link 56 moves along cam surface 58, the link end 100 moves slightly outwardly toward the side of the base 12 until the actuator 60 is free to pass between the link end 100 and the jaw restraint 50.

At the same time catch release actuator 62 (FIGS. 9 and 10) also carried on the sliding gate 36, is moved against the catch release cam 54 forcing it to the right and at the same time rotating the jaw restraint 50 in a clockwise direction against bias spring 34. As the step 76 in the jaw restraint 50 becomes aligned with end 82 of the control trigger mechanism 52, the end 82 is biased downwardly into the step. The actuator 62 passes over the catch release cam and the gate is returned to its original position.

THE SECOND EMBODIMENT

When stripping meat from animal leg bones in automated equipment, the fibula bone is preferably removed before the automatic stripping operations are performed. This is disclosed in the above-mentioned patents wherein the fibula is removed by a sharpened chisel placed over the fibula and forced along its length where it breaks the fibula from the tibia bone.

When the fibula is removed in automated equipment, it is desirable to hold the tibia from longitudinal movement at the same time the chisel is driven along the fibula.

Figure 13:
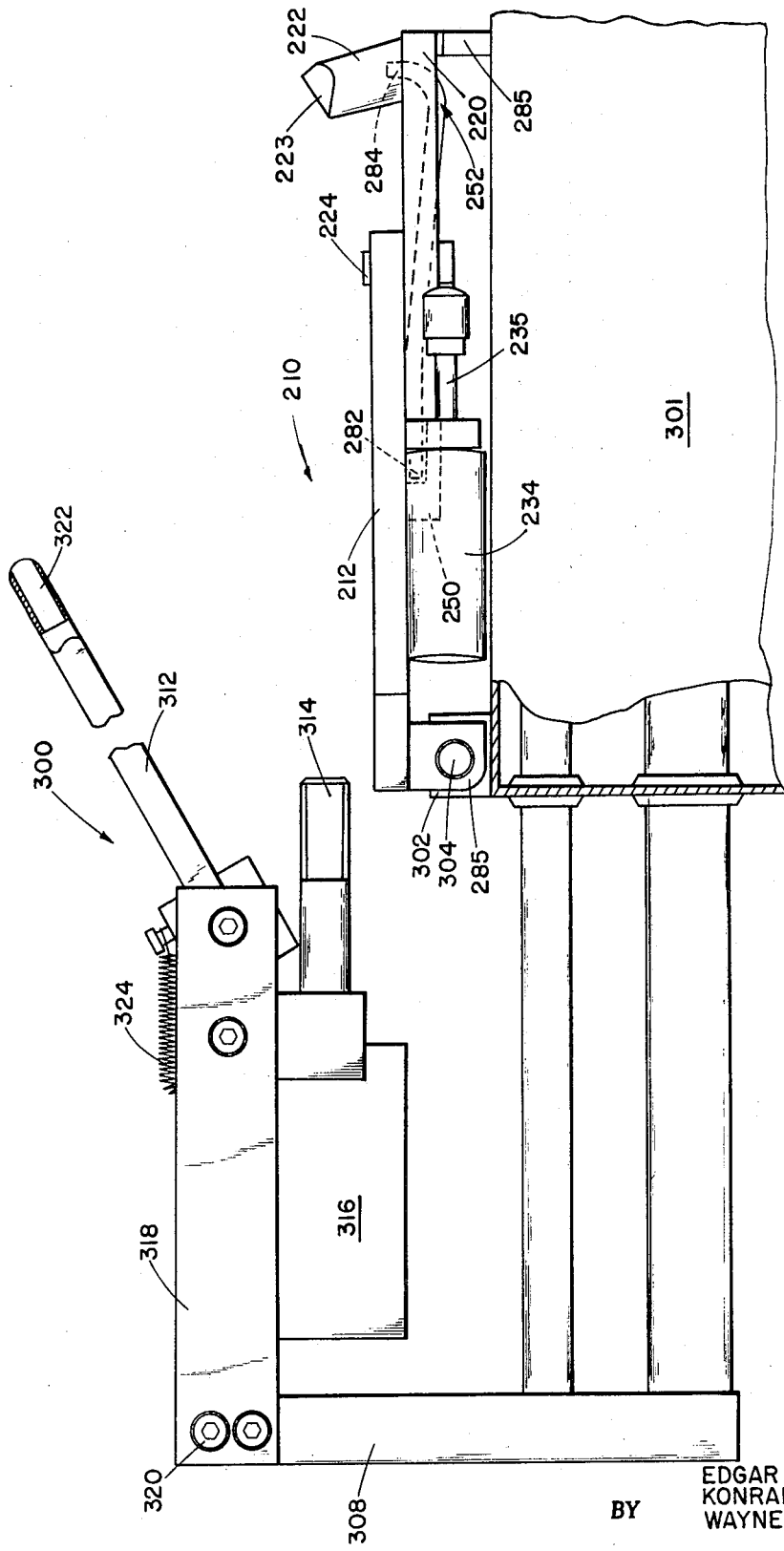
FIG. 13 is a side view of the embodiment shown in FIG. 12.

In accordance with the second embodiment of the invention, illustrated in FIGS. 12 through 14, the apparatus includes a bone holding mechanism for holding the tibia bone while removing the fibula bone. Such construction is similar to, but considerably simplified with respect to, the embodiment shown in FIGS. 1 through 11.

The bone holding device of this embodiment is generally used in a horizontal plane as contrasted to the vertical mounting of the first embodiment. A chisel holder and driver mechanism, generally indicated by the numeral 300, are arranged on a support base or working surface 301 for longitudinal movement along and above the top of the work surface. The bone holding mechanism, generally designated by the numeral 210, is mounted horizontally on the top of the surface 301 and arranged to be in alignment with the chisel holder and drive mechanism 300. The bone holding mechanism 210 has a base member 212 with a fixed jaw or clamping surface 216 formed as an integral part thereof. The jaw 216 has an upwardly extending leg portion 218 fixed at one end thereof forming a chisel point 219 at its upper end. A movable jaw 220, also having an upwardly extending leg portion 222 forming a chisel point 223 at its upper end, is pivotally mounted on the base member 212 on a pivot pin 224. As best illustrated in FIG. 14, the movable jaw 220, pivotable about pivot pin 224, has a transversely extending arm portion 228 and a longitudinally extending portion 230. An air cylinder 234 having a movable actuator 235 is mounted on the base member 212 and serves as a constant biasing force against the laterally extending arm 228 of the movable jaw 220 to bias it toward a closed position with respect to the fixed jaw 216.

A jaw restraint 250 is pivotally mounted on a pin 270 on the base member 212.

A bias spring 271, fixed at one of its ends to the jaw restraint 250 and at its other end to the base member 212, is provided to urge the jaw restraint 250 against the extended end 230 of the movable jaw.

A control trigger assembly 252, positioned between the jaws, extends lengthwise under the base 212 where at one end 282 it contacts the jaw restraint 250. The other end 284 of the control trigger assembly is bent upwardly (FIG. 13) adjacent the upturned leg portions 218 and 222 of the jaws. The central portion of the control trigger is hingedly mounted below the base 212 by means of a pin 280 (FIG. 12) supported by the base member. The control trigger assembly is biased into an upward position by means of spring 271 applying a force to a transversely extending pin 286 fixed to the control trigger and extending under the bias spring 271.

When in a first or bone receiving position, the control trigger prevents the movement of the jaw restraint 250 by having its end 282 positioned against the restraint. When a bone is inserted between the jaws of the holder, it contacts the upturned end 282 of the control trigger, pushing it downwardly causing it to rock around the pin 280. The opposite end 282 moves upwardly and slides into an opening 276 provided in the jaw restraint 250, allowing the bias spring 271 to move the jaw restraint to a forward position.

The jaw restraint 250 has a series of stepped portions 290, 292 and 294 machined into its surface. Once the control trigger assembly has been released by the insertion of a bone between the jaws, and as the movable jaw is urged toward a closed position by the air cylinder 234, the extension of the movable jaw 230 moves along the steps and prevents the jaw from opening.

The base member 212 is mounted horizontally on the support base 301 with the leg portions 218 and 222 of clamping members 216 and 220 extending vertically upward. The base is fixed on the work surface 301 by means of extended mounting brackets 285 on the lower surface of the base which cooperate with a mounting block 302 fixed on the work surface. Mounting pin 304 passed through the mounting brackets 285 in the mounting block 302 prevents longitudinal movement of the holder. The opposite end of the holder below the jaw 216 and 220 is held in the horizontal position above the work surface by means of a leg member 285 which is attached to the fixed jaw 216 and slidably receives the movable jaw 220 when it is in a closed position.

The chisel driver 300 is arranged to be driven by means of a conventional hydraulic or mechanical actuator (not shown) which may be conveniently located in the support base 301. An extending movable rod or piston 306 connected to the actuator is connected at its extended end to a vertical support member 308. A guide rod or shaft 310 fixed parallel to the actuator piston 306 and connected to the vertical support passes through the side walls of the support base to provide rigidity to the assembly and guide the driver mechanism in a longitudinal path with respect to the bone holder 210.

A movable chisel assembly 312, a bone pusher 314, and a jaw restraint release actuator 316 are mounted to the upper portion of the vertical support 308 on a pair of horizontal support members 318. Screw members 320 hold the support members 318 to the vertical support 308. Mounted at the opposite or forward end of the horizontal support members 318 is a chisel assembly 312 having a head portion 322 adapted to surround the tibia bone in a manner as disclosed in the previously mentioned patents. The chisel assembly 312 is pivotably mounted between support members 318 by means of shoulder screws 324 passing through the support member and threadably received in a pivot block 326 which supports the chisel assembly 312. A bias spring 328 is connected to the pivot block 326 to bias the chisel in an upright position. The bone pusher 314 is mounted in a block 330 fixed by screws 320 between the support members 318. The jaw stop actuator 316 is fixed to one side of the support member 318. As shown in phantom in FIG. 5, the actuator 316 is adapted, when in a forward position, to contact the jaw restraint member 250.

OPERATION OF SECOND EMBODIMENT

Figure 6:
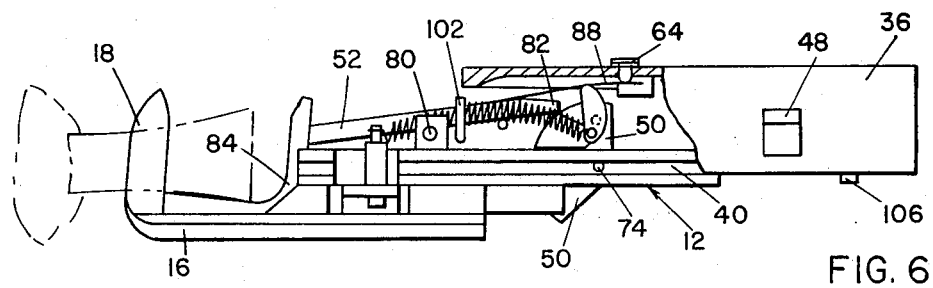
FIG. 6 is a view like FIG. 2 showing a bone inserted between the jaws and the trigger mechanism activated to release the jaw retraining structure.

The apparatus is shown in a bone holding or gripping position in FIGS. 5 through 7. An animal meat cut is positioned over the sharpened vertical legs 218 and 222 of the jaws with the fibula bone positioned upwardly. The tibia bone is between the legs of the jaws and the chisel 312 is moved downwardly against the bias spring 324 into the position shown in phantom in FIG. 12 surrounding the fibula bone. As the bone is inserted between the jaws, the upstanding end 284 of the control trigger 252 has been contacted causing it to pivot around pivot pin 280 thereby moving the end 282 into the cutout portion 276 of the jaw restraint 250. The jaw restraint 250 is biased forwardly to contact the extended arm 230 of the movable jaw 220 in one of the stepped portion 290, 292 or 294.

The chisel driver assembly 300 is then drawn toward the jaws of the bone holder 210 by the actuator located in the support base 301. While the chisel driver assembly starts its forward travel, the bias of air cylinder forces the jaws 216 and 220 tightly together to securely hold the tibia bone. The chisel head 322, having previously been placed over the fibula bone is then driven along its length by movement of the driver 300 toward the jaws. As the driver nears the completion of its travel toward the jaws, the jaw restraint actuator 316 contacts the jaw restraint 250 (shown in phantom, in FIG. 12) causing the jaw restraint to rotate in a clockwise direction about pivot pin 270, thereby releasing the movable jaw 220. At the same time, air cylinder 234 is de-energized, and pusher 314 contacts the bone between the jaws pushing it outwardly. As the bone is pushed out, the control trigger mechanism is moved upwardly by bias spring 271, and the end 282 contacts the side surface of the jaw restraint 250, preventing the stepped portions 290, 292 and 294 from contacting the extended portion 230 of the movable jaw, thereby rendering the jaw 220 freely movable about pivot pin 224.

The fibula bone has been removed and is supported in the chisel head 322 where it may be easily removed and the meat surrounding the tibia has been cut by the sharpened legs 218 and 222 of the jaws thereby exposing a portion of the tibia for further processing.

It may therefore readily be seen that the invention provides a greatly improved bone holding mechanism for use with automated deboning machines wherein a bone held thereby is firmly restrained from longitudinal and rotational movement automatically and without damage to the bone. The apparatus further automatically adjusts to bones of varying sizes and releases the bone upon completion of the operations being performed thereon. Other modifications and variations will be suggested to those skilled in the art without departing from the scope of the invention which is defined by the following claims.

The embodiments of the invention in which an exclusive property or privilege is claimed are defined as follows:

1. A bone holding apparatus comprising:
   a base member;
   a pair of jaws mounted on said base member, one of said pair movable with respect of the other of said pair of jaws; means on said jaws adapted to hole the end portion of a bone placed therebetween;
   means for urging said jaws toward a closed position; and
   restraining means for progressively restraining said movable jaw from opening as it is moved toward a closed position.

2. A bone holding apparatus as claimed in claim 1 and further comprising means biasing said restraining means toward said movable jaw.

3. A bone holding apparatus as claimed in claim 2 and further comprising control means for said restraining means, said control means extending at its one end between said jaws and having its other end adapted to operatively control said restraining means to either permit or prevent said restraining means from restraining said movable jaw.

4. The bone holding mechanism as claimed in claim 3 wherein said control means includes a trigger responsive to the insertion of a bone between said bone holding means to cause said other end of said control means to operatively control said restraining means and allow it to contact said movable jaw.

5. A bone holding apparatus as claimed in claim 4 wherein means are provided to bias said control means into a bone insertion responsive position.

6. The bone holding structure as claimed in claim 1 and further comprising means slidably mounted on said base and cooperating with said jaws to prevent movement of said bone from between said jaws.

7. Apparatus for holding a bone in an automatic deboning machine comprising:
   a base member;
   a pair of relatively movable jaws mounted on said base member;
   laterally extending supports mounted on said jaws adapted to hold a bone therebetween;
   a jaw restraining means resiliently biased toward said jaws;
   a control means maintaining said restraining means in a first position, said control means including a member pivotedly mounted on said base and extending between said supports, said member being movable in response to the insertion of a bone between said supports wherein in response to movement thereof, said restraining means is released to engage said movable jaw to thereby prevent its opening.

8. A bone holding apparatus as claimed in claim 7 and further comprising: a gate mechanism, slidably mounted on said base for cooperation with said jaws in a first position to prevent lateral and longitudinal movement of said bone; actuator members mounted in said gate mechanism cooperable with said jaw restraining means and said movable jaw to permit opening said jaws when said gate is moved to a second position.

9. A bone holding apparatus as claimed in claim 8 and further including normally open electrical circuit means mounted on said control means and said gate mechanism, said circuit means momentarily closing in response to movement of said control means to thereby initiate movement of said gate mechanism.

10. A bone holding apparatus as claimed in claim 9 wherein said electrical circuit means comprises a switch contact member mounted on said control means and an isolated switch contact mounted on said gate mechanism.

11. In an apparatus for automatically removing the fibula bone from animal meat cuts, the combination comprising:
  a base member;
  a pair of relatively movable jaws mounted on said base member and adapted to hold a tibia bone at one end between said jaws;
  means urging said jaws toward a closed position for gripping said tibia bone and preventing longitudinal movement thereof;
  a fibula bone removing member; and
  means driving said fibula bone removing member along said held bone.

12. A bone removing apparatus as claimed in claim 11 and further comprising restraining means for restraining said movable jaw from opening as it is progressively urged toward a closed position.

13. A bone removing apparatus as claimed in claim 12 and further comprising means biasing said restraining means toward said movable jaw.

14. A bone removing apparatus as claimed in claim 13 and further comprising control means mounted on said base and extending at its one end between said jaws and at its other end engaging said restraining means to thereby prevent said restraining means from contacting said movable jaw.

15. A bone removing apparatus as claimed in claim 14, wherein said control means, in response to the insertion of a bone between said jaws, is disengaged from said restraining means, allowing it to contact and restrain said movable jaw.

16. A bone removing apparatus as claimed in claim 13 wherein means are provided to bias said control means into a bone insertion responsive position.

17. A bone removing apparatus as claimed in claim 14 and further comprising actuator means mounted on said driving means to release said restraining means when said bone removing means has removed said fibula bone.

18. A bone removing apparatus as claimed in claim 15 and further comprising means on said driving means to force said tibia bone from said jaws after the fibula bone has been removed.

19. In an apparatus for holding a bone in an automatic deboning machine, the combination comprising:
  a base member;
  a pair of jaws mounted on said base member, one of said pair of jaws movable with respect to the other of said pair, said movable jaw having a laterally extending arm portion extending along said base member;
  outwardly extending clamping members mounted on said jaws adapted to hold the end portion of a bone placed therebetween; and
  a jaw restraint mounted in said base adapted to contact said laterally extending arm of said movable jaw to prevent said jaw from opening.

20. A bone holding apparatus as claimed in claim 19 and further comprising:
  a gate mechanism slidably mounted on said base member toward and away from said outwardly extending members on said jaws;
  means biasing said gate and said jaw toward a closed position; and
  a control member pivotably mounted on said base holding said jaws and said gate in an open position, said control member movable in response to the insertion of a bone between said jaws to close said jaws and gate.

21. A bone holding apparatus as claimed in claim 20 and further including actuating members mounted on said gate mechanism cooperable with said control member and said jaw restraint to open said jaws as said gate is moved away from said outwardly extending members on said jaws along said base.

22. In an apparatus for automatically removing the fibula bone from the tibia bone of animal meat cuts, the combination comprising:
  a base member;
  a pair of jaws mounted on said base member, one of said jaws movable with respect to the other of said jaws, said movable jaw having a laterally extending arm portion extending along said base member;
  clamping members mounted on said jaws adapted to hold the end portion of a tibia bone placed therebetween;
  an air cylinder for urging said jaws toward a closed position to grip said tibia bone between said upwardly extending support members and preventing longitudinal movement of said tibia bone;
  a jaw restraint mounted on said base resiliently biased toward said extending arm of said movable jaw; and
  a power driving mechanism having a fibula bone removing member mounted thereon, said driving mechanism moving said fibula bone remover along said tibia bone to remove said tibia bone from said fibula bone.

23. The apparatus as claimed in claim 22 and further comprising a control member extending between said jaws, pivotably mounted on said base member and in a first position holding said jaw restraint away from said extending arm of said movable jaw, said control member in response to the insertion of a bone between said jaws movable away from said jaw restraint to allow said restraint to contact said extended arm of said jaw to prevent the opening of said jaws.

* * * * *